US011793203B2

United States Patent
Watts et al.

(10) Patent No.: US 11,793,203 B2
(45) Date of Patent: Oct. 24, 2023

(54) CARBON NANOSPHERE-COATED BACTERIA AS MOSQUITO LARVICIDES

(71) Applicant: THE UAB RESEARCH FOUNDATION, Birmingham, AL (US)

(72) Inventors: Stephen A. Watts, Birmingham, AL (US); Andrei V. Stanishevsky, Birmingham, AL (US); Mickie L. Powell, Birmingham, AL (US); Robert Novak, Tampa, FL (US)

(73) Assignee: The UAB Research Foundation, Birmingham, AL (US)

( * ) Notice: Subject to any disclaimer, the term of this patent is extended or adjusted under 35 U.S.C. 154(b) by 0 days.

(21) Appl. No.: 16/070,856

(22) PCT Filed: Jan. 20, 2017

(86) PCT No.: PCT/US2017/014260
§ 371 (c)(1),
(2) Date: Jul. 18, 2018

(87) PCT Pub. No.: WO2017/127630
PCT Pub. Date: Jul. 27, 2017

(65) Prior Publication Data
US 2019/0059388 A1    Feb. 28, 2019

Related U.S. Application Data

(60) Provisional application No. 62/280,894, filed on Jan. 20, 2016.

(51) Int. Cl.
*A01N 63/22*    (2020.01)
*A01N 63/23*    (2020.01)
(Continued)

(52) U.S. Cl.
CPC ............. *A01N 63/22* (2020.01); *A01N 25/08* (2013.01); *A01N 25/10* (2013.01); *A01N 25/26* (2013.01); *A01N 63/23* (2020.01)

(58) Field of Classification Search
None
See application file for complete search history.

(56) References Cited

U.S. PATENT DOCUMENTS 5,698,210 A  * 12/1997  Levy ...................... A01N 25/10
                                                            424/405
2009/0196909 A1*  8/2009  Cooper ................... A47L 13/17
                                                            424/445

FOREIGN PATENT DOCUMENTS

WO    2011/027355 A1    3/2011
WO    2015/170320 A2    11/2015

OTHER PUBLICATIONS

Saxena et al., RSC Adv. 3: 22504-22508 (2013).*
(Continued)

*Primary Examiner* — Erin M. Bowers
(74) *Attorney, Agent, or Firm* — Thomas | Horstemeyer, LLP (57) ABSTRACT

Compositions and methods of use thereof for delivering an insecticide to water-borne insect larvae are provided. Whereas individual cells of the insecticidal bacteria such as *Bacillus thuringiensis israelensis* (Bti), are effective in killing insect larvae when ingested by same, their use in aqueous environments is restricted by the time that the bacterial cells remain suspended in water and hence available for ingestion by the larvae. To increase the time that the insecticidal bacteria remain in suspension, it has now been found advantageous to mix bacterial suspensions with nanoparticles comprising carbon that attach to the external surface of the cells.

21 Claims, 6 Drawing Sheets

(51) Int. Cl.
    *A01N 25/08*    (2006.01)
    *A01N 25/10*    (2006.01)
    *A01N 25/26*    (2006.01)

(56) References Cited

OTHER PUBLICATIONS

Siegel et al., J. Am. Mosquito Control Ass'n. 17(1): 33-41 (2001).*
He et al., Colloids and Surfaces B: Biointerfaces 87: 326-332 (2011).*
International Search Report and Written Opinion for PCT/US17/14260 dated Apr. 13, 2017.
Siegel, et al. (2001) "Recovery of Commercially Produced *Bacillus thuringiensis* Var. *Israelensis* and Bacillus sphaericus From Tires and Prevalence of Bacilli in Artificial and Natural Containers." J. Amer. Mosquito Control Assoc. 17(1): 33-41.
Yuan, et al. (2009) "Use of Carbon Nanoparticles for Bacteria Immobilization in Microbial Fuel Cells for High Power Output." J. Electrochem. Soc. 156(10): B1238-B1241.
Lacey, Lawrence A. (2007) "Bacillus thuringiensis Serovariety Israelensis and Bacillus sphaericus for Mosquito Control." J. Amer. Mosquito Control Assoc. 23(Supplement No. 2): 133-163.

* cited by examiner

CARBON NANOSPHERE-COATED BACTERIA AS MOSQUITO LARVICIDES

CROSS-REFERENCE TO RELATED APPLICATION

This application is the 35 U.S.C. § 371 national stage application of PCT Application No. PCT/US2017/014260, filed Jan. 20, 2017, where the PCT claims priority to U.S. Provisional Application No. 62/280,894, entitled "CARBON NANOSPHERE-COATED BACTERIA AS MOSQUITO LARVICIDES" filed on Jan. 20, 2016, the entirety entireties of which is are herein incorporated by reference.

FIELD OF THE DISCLOSURE

The present disclosure relates to insect larvicidal compositions comprising larvicidal bacterial cells having carbon nanoparticles attached thereto, and to methods of use thereof.

BACKGROUND

As vectors, mosquitoes indirectly contribute to over one million deaths worldwide, more than any other organism. Mosquitoes are capable of transmitting protozoan and filarial diseases and viruses (including malaria, yellow fever, Dengue fever, and West Nile virus) to humans and/or other animals. Recent control methods of mosquitoes include the use of the naturally occurring bacterium *Bacillus thuringiensis* (Bti) found commonly in soils. This bacterium creates proteinaceous parasporal crystalline inclusions that are toxic for specific insects. These crystals are actually pores that are inserted into the gut epithelium leading to cell death.

Cells of Bti have minimal retention time within the water column; they do not stay suspended very long and sink too quickly to the bottom to be efficiently ingested by insect larvae. Since the bacterium is only effective at killing mosquitoes during the larval stage of development, this leaves only a four-day window for biological activity. Accordingly, the retention time of Bti in the water column is essential for maximal efficacy. A substantial need exists, therefore, for a sustained-release microbial biopesticide composition that remains in place when applied, achieves effective microbial control of pest populations, and provides a continuous release of microbial pesticide to the water surface to maintain an effective mosquito controlling concentration for long periods during the temperate or breeding season.

SUMMARY

One aspect of the disclosure encompasses embodiments of a composition comprising a population of carbon nanoparticles, wherein said carbon nanoparticles can have at least one species of larvicidal bacteria attached thereto.

In some embodiments of this aspect of the disclosure, the at least one species of larvicidal bacteria can be a strain of *Bacillus thuringiensis*, a strain of *Bacillus sphaericus*, or a combination thereof.

In some embodiments of this aspect of the disclosure, the population of carbon nanoparticles can be mixed with a liquid medium, wherein the liquid medium can be miscible with water.

Another aspect of the disclosure encompasses embodiments of a method of reducing a population of mosquito larvae by delivering to a population of mosquito larvae in a body of water an insect larvicidal composition comprising a population of carbon nanoparticles, wherein said carbon nanoparticles can have at least one species of larvicidal bacteria attached thereto, and wherein said cells can be mixed with a liquid medium miscible with the body of water.

Yet another aspect of the disclosure encompasses embodiments of a kit comprising a container containing a composition comprising a population of carbon nanoparticles, wherein said carbon nanoparticles can have at least one species of larvicidal bacteria attached thereto, and instructions for suspending said cells in a liquid medium for delivering the cells to a water body having an infestation of mosquito larvae.

BRIEF DESCRIPTION OF THE FIGURES

Many aspects of the disclosure can be better understood with reference to the following drawings.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of medicine, organic chemistry, biochemistry, molecular biology, pharmacology, and the like, which are within the skill of the art. Such techniques are explained fully in the literature.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the following terms have the meanings ascribed to them unless specified otherwise. In this disclosure, "comprises," "comprising," "containing" and "having" and the like can have the meaning ascribed to them in U.S. Patent law and can mean "includes," "including," and the like; "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Prior to describing the various embodiments, the following definitions are provided and should be used unless otherwise indicated.

Abbreviations

Bti, *Bacillus thuringiensis israelensis*; Bs, *Bacillus sphaericus*; HTCP, hydrothermally-fabricated carbon particle; TEM, transmission electron microscopy; SEM, scanning electron microscopy Definitions The term "carbon nanoparticles" as used herein refers to nanoparticles that are totally or substantially composed of carbon. Such particles may be spherical, spheroidal, or tubular and may have a substantially smooth exterior surface or a surface that is substantially or partially irregular with protuberances, depressions or a mixture thereof.

The term "attached" as used herein refers to carbon nanoparticles of the present disclosure attached to the exterior surface of bacteria by either electrostatic bonds or by covalent conjugation thereto. Most advantageously, the nanoparticles of the disclosure are attached by electrostatic bonding occurring following the admixing of bacterial suspensions together with the nanoparticles.

The term "insect larva" as used herein refers to the pre-imago stage of insect metamorphic development. The term "mosquito larvae" as used herein refers to the immature form of *Aedes* mosquitoes and related genera (such as *Culex*). The larvae are typically suspended from the water-air interface by abdominal breathing tubes, with their heads below the surface of the water. These larvae feed by filtration of particles suspended just below the surface of the water. The larvae eventually develop into the pupal stage before emergence of the adult flying insect.

The term "liquid medium" as used herein refers to any body of water that does or may harbor insect larvae including the larval form of the mosquito or related dipteran species.

The terms "larvicide" and "insect larvicide" as used herein refer to an agent, most advantageously, but not limited to, bacterial cells of such species as *Bacillus thuringiensis* (strain) *israelensis* (Bti) and *Bacillus sphaericus* (Bs). In the context of the present disclosure, a larvicide may also refer to bacterial cells that have been genetically modified to express a larvicidal polypeptide as a heterologous protein. For example, but not intended to be limiting, the bacteria may be a strain of *Escherichia coli* that contains a heterologous genetic element and expresses a larvicidal polypeptide. Such embodiments can allow for genetic modification of the larvicide to direct the agent against species of *Aedes* other than *A. aegytae*, against other genera of insects, or to increase the efficacy of the heterologous protein larvicide compared a wild-type larvicidal protein.

The term "substantial percentage" as used herein refers to the majority percent of a population of cells. Typically in a composition of the disclosure, advantageously at least 80%-85%, more advantageously at least 90-95%, and even more advantageously at least 95%-100% of the bacterial cells have a plurality of carbon nanoparticles attached thereto.

The terms "pesticidal," "insecticidal," and "larvicidal" as used herein synomously refer to the activity of a substance (such as, for example, a protein) that can be measured by, but is not limited to, pest mortality, pest weight loss, pest repellency, and other behavioral and physical changes of a pest after feeding and exposure for an appropriate length of time. Such changes will ultimately result in the death of the larva. Thus, an organism or substance having pesticidal activity adversely impacts at least one measurable parameter of pest fitness. For example, "pesticidal proteins" are proteins that display pesticidal activity by themselves or in combination with other proteins.

The term "infestation" as used herein refers to a population of insects including, but not limited to, those of the Order Diptera. The population may be of any size up to and including a size that represents as significance source of physical irritation and annoyance to other organisms, particularly due to biting by the insects or allows the spread of a disease to other organisms.

The term "insecticidally-effective amount" as used herein refers to an amount of a *Bacillus thuringiensis* (Bt) strain or variant thereof (such as *Bacillus thuringiensis israelensis* (Bti)) or *Bacillus sphaericus*, or spores or crystals of the strain or a variant thereof that is capable of controlling or eradicating an insect as measured by an increase in percent mortality, or reduction of a pathological condition related to the presence of the insects.

The term "Diptera" as used herein refers to an extensive order of insects having two functional wings, two balancers, and mouthparts modified for sucking or piercing. Such insects undergo a complete metamorphosis with larval, pupal and adult stages. Among the Diptera are the Nematocera, which includes the black fly, crane fly, gnat, midge, mosquito, and sand fly.

The term "biopesticide" as used herein refers to naturally occurring pesticides frequently derived from unicellular or multicellular organisms that have developed natural defenses against other organisms. The soil bacterium *Bacillus thuringiensis* subsp. *israelensis* (Bti) is one of many *B. thuringiensis* strains able to produce insecticidal proteins toxic when ingested by the larvae of Diptera, including mosquitoes and black flies. Upon ingestion, crystal proteins are solubilized in the larval midgut and disrupt the epithelium of the larval midgut region. Swelling and/or lysis of the epithelial cells is followed by larval death from starvation.

*Bacillus thuringiensis* subspecies *israelensis* (Bti) has been used successfully in mosquito and blackfly control programs for many years. Bti is used in clean to moderately clean organic breeding habitats, and is most effective on *Aedes* species and commercial formulations of Bti are available under the trademark VECTOBAC® available from Valent BioSciences Corp. Bti is effective against a broad range of mosquito species, offers low mammalian toxicity and is easy to apply. Bti also has a very low susceptibility to the development of resistance, because its larvicidal activity is based on multiple toxins. The probability that individual mosquitoes within a treated population will not be susceptible to all toxins is extremely small.

*Bacillus thuringiensis* (Bt) is a Gram-positive, facultative, spore-forming, and rod-shaped bacterium that produces insecticidal crystals during sporulation. These crystals generally contain from three to seven proteins referred to as δ-endotoxins (known commercially as "Bt toxins") in inactive or protoxin forms, the combination of which dictates insect specificity. Unlike conventional chemical insecticides that generally kill through non-specific contact with a target insect, Bt-based products must be ingested by insects with a generally alkaline (reducing environment) midgut (pH range of 10-12) and specific gut membrane structures are required to bind the δ-endotoxin. Not only must the insects have the correct physiology and be at a susceptible stage of development, but also the bacterium must be consumed in sufficient quantity.

Bt-based products require a specific set of interactions with a target insect to cause death. The insect must initially ingest the crystals, which then travel to the midgut. Upon entering the midgut, the crystals are solubilized as a result of a high reducing capacity of the digestive fluid (pH 10). The released protoxins are then cleaved by a gut protease to produce active toxins termed δ-endotoxins. The δ-endotoxins interact with digestive cells lining the midgut, causing leakage of the cells. Such leakage disrupts general insect homeostasis mechanisms, ultimately causing insect death.

Bt strains produce two types of toxin, namely the Cry (crystal) toxins encoded by different cry genes, and the Cyt (cytolytic) toxins which can augment the activity of Cry toxins, enhancing the effectiveness of insect control. Several successful Bt varieties or Bt-based products are presently commercially available for controlling immature stages of aquatic Diptera (Bt israeliensis (Bti)), and Coleoptera (Bt tenebrionis). Over forty classes of Bt toxins have been identified, but only six classes are present in current commercial formulations: Bt kurstaki-Cry1Aa, Cry1Ab, Cry1Ac, Cry1Ia, Cry2A Bt aizawa-Cry1Ab, Cry1Ac, Cry1C, Bt israeliensis-Cry4A, Cry4B, Cry11, CytA; and Bt tenebrionis-Cry3. To date, current Bt strains and preparations are generally limited to a few, particular insects within the Order, but not to all members thereof. U.S. Pat. No. 6,482,636 to Donovan et al. describes a Bt israeliensis strain which is toxic to mosquito larvae.

The compositions and methods of the disclosure are also contemplated to advantageously relate to the use of the insecticidal/larvicidal *Bacillus sphaericus* (Bs), a rod-shaped, aerobic, spore-forming bacterium found commonly in soil and other substrates. At least 16 strains have been found to show mosquitocidal properties of various degrees. Several strains such as 1593M, 2362 and 2297 exhibit high toxicity to mosquito larvae. *Bacillus sphaericus* strain 2362, (VECTOLEX®, available from Valent BioSciences Corp.) has been used in many countries successfully. Specific commercial formulations of Bs available from the same source are VECTOLEX® WDG (Water dispersible granular formulation with a label claim of 650 Bs ITU/mg) and VECTOLEX® CG 1014 Mesh corncob granular formulation with a label claim of 50 Bs. ITU/mg). Moreover, this strain was found to perform well in controlling mosquitoes breeding in various habitats, especially ones with polluted water.

*Bacillus sphaericus* is most effective on *Culex* species. The activity of Bs is due to a binary toxin, and repeated use of this toxin in the same habitats has been reported to lead to development of resistance. However, various levels of resistance to Bs by mosquito larvae have been observed in *Culex pipiens* and *Culex quinquefasciatus*.

DESCRIPTION

The present disclosure provides embodiments of compositions and methods of use thereof for delivering a bacterial insecticide to water-borne insect larvae. It has been found that, whereas individual cells of the insecticidal bacteria such as *Bacillus thuringiensis israelensis* (Bti) or *Bacillus sphaericus*, are effective in killing insect larvae when ingested by same, their use in aqueous environments is restricted by the time that the bacterial cells remain suspended in water and hence available for ingestion by the larvae. To increase the time that the insecticidal bacteria remain in suspension, it has now been found advantageous to mix bacterial suspensions with nanoparticles comprising carbon. The nanoparticles of the disclosure can attach to the external surface of the cells, most likely by electrostatic bonding, and substantially increase the time that the bacterial cells can remain suspended and available for ingestion by insect larvae. Further increases in the retention time may be advantageously obtained by admixing the carbon nanosphere-bacteria compositions of the disclosure with small (5 mm-0.4 mm average diameter corn cob particles that can assist in the suspension or flotation of the larvicidal nanoparticle-based compositions.

Mosquitoes and biting flies develop worldwide in aquatic environments during temperate months, creating serious public health problems through disease transmission and biting insect annoyance. Control of these public health insects is costly due to the significant labor, equipment and material requirement necessary. To achieve control, all potential breeding sites within the pest insect's flight range must be inspected weekly during summer months, and if found breeding, control materials must be applied. The development of effective, soluble pesticide controlled-release formulations for aquatic environments lasting up to 150 days in the early 1980's by Sjogren (U.S. Pat. No. 4,732,762) provided significant labor savings and reduced control costs. This technology has been commercialized using the soluble insect growth regulator S-methoprene, and has gained widespread acceptance and use.

In the mid 1980's, a microbial pathogen *Bacillus thuringiensis* var. *israelensis* (Bti) was discovered and commercialized biopesticide for pest control. In the mid 1990's, a second microbial pathogen of mosquitoes, *Bacillus sphericus* (Bs) was also brought to market. These microbial biopesticides are recognized for their environmental compatibility, and have become control materials of choice for use in mosquito control programs. To be effective, however, these microbial pathogen particles (having a specific gravity of greater than 1.0) must be applied to the water surface and ingested by aquatic immature biting fly stages, before they settle out of the water column. This is now achieved for short term control by liquid or floating corn cob granules (of less than ½ mesh) applied to flooded field sites that contain mosquito larvae. The duration of control achieved by such liquid or granular treatments vary with the dosage applied, ranging from 24 to 72 h with Bti, and 7 to 28 days with Bs.

Sjogren (U.S. Pat. No. 5,484,600) in 1996, described a timed-release microbial granule formulation in the form of a composite particle. The particle is in the form of a dense core, a flotation particle, a pesticide and an adhesive that delivered microbial pesticidal particles to the water surface for mosquito control. In these compositions, microbial powders were blended with a buoyant agent and attached to the outside of a sinking granular carrier. A slow dissolving, water soluble protein binder released the buoyant agent and microbial pesticide to the water surface over 10 to 30 days.

Kase (U.S. Pat. No. 4,631,857 ('857)) describes the delivery of particulate (1.5 to 15 µm) microbial pesticide consisting of a mixture of cork, a larvicidal micro-organism (Bti), gypsum plaster and water sufficient to set the plaster to produce a floating molded unit. When applied into small aquatic field sites, the plaster slowly dissolves to release the Bti at the water surface. Although the composition is reported to control mosquitoes for up to one month in very small field sites, the '857 invention has a number of disadvantages that are overcome by the present compositions and methods of the present disclosure. Thus, the floating molded unit releases Bti directly into the water as the plaster disintegrates, which limits the lateral dispersal of the sinking particulate pesticide. The floating unit can be beached by winds rendering it ineffective, and anchoring it in place is labor intensive. The unit's large size, about 2 inches diameter, and its light weight, renders it impractical to disperse with mechanical equipment; and its control effectiveness is limited to approximately 30 days.

Particulate pest control compositions used in water perform best when they are evenly distributed in field mosquito breeding sites, and remain in place after application, delivering particulate pathogenic particles at the water surface. Floating compositions readily drift away from where they are applied, and do not achieve the uniform distribution of microbial particles at the water surface in large sites, required for pest insect feeding ingestion. Thus, sinking compositions perform more dependably than floating compositions under diverse field conditions.

It has been difficult to achieve development of an effective sinking sustained release microbial composition that delivers particulate, non-water soluble, microbial pesticides at the water surface over a prolonged period to control aquatic biting flies. For microbial particulate pesticides to be effective they must be uniformly distributed on the water surface of field sites and remain available long enough to be ingested by filter feeding mosquito larvae. Granule and pellet compositions must be small enough to permit large numbers to be distributed with mechanical equipment to provide multiple release loci. For such small units to be effective, the composition must be highly efficient to continuously deliver pest controlling quantities of particulate pesticides.

A substantial need exists, therefore, for a sustained release microbial biopesticide composition that remains in place when applied, achieves effective microbial control of pest populations, and provides a continuous release of microbial pesticide to the water surface to maintains an effective mosquito controlling concentration for long periods during the temperate or breeding season. However, cells of Bti have minimal retention time within the water column; it does not stay suspended very long and sinks too quickly to the bottom. Since the bacterium is only effective at killing mosquitoes during the larval stage of development, this leaves only a four-day window for biological activity. Accordingly, the retention time of Bti in the water column is essential for maximal efficacy.

The present disclosure provides embodiments of compositions and methods of use thereof for delivering an insecticide to water-borne insect larvae. It has been found that, whereas individual cells of the insecticidal bacteria such as *Bacillus thuringiensis israelensis* (Bti) are effective in killing such insect larvae when ingested by same, their use in aqueous environments is restricted by the time that the bacterial cells remain suspended in water and hence available for ingestion by the larvae. To increase the time that the insecticidal bacteria remain in suspension, it has now been found advantageous to mix bacterial suspensions with nanoparticles comprising carbon before distributing the composition to a body of water infested by mosquito larvae. The nanoparticles of the disclosure can attach to the external surface of the insecticidal bacterial cells, reduce the sink-rate of the bacteria in the water column and substantially increase the time that the bacterial cells can remain suspended and available for ingestion by insect larvae.

The Bti-nanoparticle constructs of the disclosure, therefore, are especially advantageous as larvicides for reducing or controlling mosquito populations in the environment and most advantageously allow for a reduction the use of environmentally undesirable agents such as general insecticides that may be non-specific in their targets and present undesirable environmental side-effects.

Accordingly, the compositions of the disclosure provide a means of increasing the effective use of insecticidal bacteria in volumes of water and do so in a manner that is not damaging to the environment. In particular, it is advantageous to use the compositions of the disclosure to decrease a mosquito infestation by reducing or eliminating the larval population before their metamorphosis to the adult form. While the compositions of the disclosure are particularly advantageous for the control of the mosquito species *Aedes aegypti* it is contemplated that the compositions of the disclosure may be usefully employed for the control of other insects, including their larval forms that have a life-cycle stage that feeds in an aqueous environment.

It was, therefore, determined that insect larvae such as *Aedes aegypti* larvae will ingest carbon nanospheres via normal feeding activity, that Bti can be bound to carbon nanospheres and retain insecticidal biological activity, and that the efficacy of Bti as an insecticide (larvicide) can be increased when bound to carbon nanospheres. This increase is due to increased retention time of suspensions of the Bti in the water and hence availability for ingestion by feeding larvae.

In a first series of experiments, it was determined that the mosquito *Aedes aegypti* can effectively filter suspensions of carbon nanospheres from the water column (usually within minutes), and that these suspensions will accumulate in the gut.

The attachment of Bti to differing compositional or configuration variants of carbon nanospheres was then investigated. One conjugate significantly enhanced the efficacy of the Bti for the first week of the trial, and was still highly efficacious 7 months later. This novel control method has the advantage of significantly enhancing mosquito control efforts, in turn decreasing the spread of mosquito-vector disease.

It is advantageous to further combine the carbon nanoparticles of the disclosure with corn cob granules having a particle size of from 4 to about 35 mesh (4.75 mm-0.5 mm sieve size), advantageously from about 8 to about 35 mesh (2.36 mm-0.5 mm sieve size), from about 12 to about 35 mesh (1.7 mm-0.5 mm sieve size), from about 16 to about 35 mesh (1.18 mm-0.5 mm sieve size), from about 20 to about 35 mesh size (0.85 mm to about 0.5 mm sieve size) that will further enhance the retention of the larvicidal bacterial in the aqueous environment for ingestion by the mosquito larvae. Corn cob particles too large for ingestion by the mosquito larvae may serve as support material allowing the larvae to graze on the attached carbon nanoparticle-bacterial compositions attached thereto.

Nanoparticles with sizes of 100 nm or less have unique chemical properties allowing them to react with many compounds. It has now been shown that the efficacy of Bti can be significantly enhanced when bound to carbon-based nanospheres. It is shown that *Aedes aegypti* mosquito larvae readily ingest those nanospheres that have Bti attached. Accordingly, one aspect of the disclosure is the enhancement of the insecticidal (larvicidal) biological activity of the Bti by effectively increasing the retention time and dispersal of the bacteria within the water column by conjugation (or attachment) of carbon-based nanospheres and Bti.

One aspect of the disclosure encompasses embodiments of a composition comprising a population of carbon nanoparticles, wherein said carbon nanoparticles can have at least one species of larvicidal bacteria attached thereto.

In some embodiments of this aspect of the disclosure, the at least one species of larvicidal bacteria can be a species of *Bacillus*.

In some embodiments of this aspect of the disclosure, the at least one species of larvicidal bacteria can be a strain of *Bacillus thuringiensis*, a strain of *Bacillus sphaericus*, or a combination thereof.

In some embodiments of this aspect of the disclosure, the strain of *Bacillus thuringiensis* can be *Bacillus thuringiensis israelensis* (Bti).

In some embodiments of this aspect of the disclosure, the strain of *Bacillus sphaericus* can be 1593M, 2362 or 2297, or any combination thereof.

In some embodiments of this aspect of the disclosure, the nanoparticles can be substantially spherical.

In some embodiments of this aspect of the disclosure, the nanoparticles can have a cross-sectional size range from about 50 nm to about 1 μm.

In some embodiments of this aspect of the disclosure, the nanoparticles can have a cross-sectional size range from about 100 nm to about 700 nm.

In some embodiments of this aspect of the disclosure, the bacteria-carbon nanoparticles can be bonded to a cellulosic substrate.

In some embodiments of this aspect of the disclosure, the cellulosic substrate can comprise corn cob particles.

In some embodiments of this aspect of the disclosure, the population of carbon nanoparticles can be mixed with a liquid medium, wherein the liquid medium can be miscible with water.

Another aspect of the disclosure encompasses embodiments of a method of reducing a population of mosquito larvae by delivering to a population of mosquito larvae in a body of water an insect larvicidal composition comprising a population of carbon nanoparticles, wherein said carbon nanoparticles can have at least one species of larvicidal bacteria attached thereto, and wherein said cells can be mixed with a liquid medium miscible with the body of water.

In some embodiments of this aspect of the disclosure, the at least one species of larvicidal bacteria can be a species of *Bacillus*.

In some embodiments of this aspect of the disclosure, the at least one species of larvicidal bacteria can be a strain of *Bacillus thuringiensis*, a strain of *Bacillus sphaericus*, or a combination thereof.

In some embodiments of this aspect of the disclosure, the strain of *Bacillus thuringiensis* can be *Bacillus thuringiensis israelensis* (Bti).

In some embodiments of this aspect of the disclosure, the strain of *Bacillus sphaericus* can be 1593M, 2362 or 2297, or any combination thereof.

In some embodiments of this aspect of the disclosure, the nanoparticles can be substantially spherical.

In some embodiments of this aspect of the disclosure, the nanoparticles can have a cross-sectional size range from about 50 nm to about 1 μm.

In some embodiments of this aspect of the disclosure, the nanoparticles can have a cross-sectional size range from about 100 nm to about 700 nm.

In some embodiments of this aspect of the disclosure, the bacteria-carbon nanoparticles can be bonded to a cellulosic substrate.

In some embodiments of this aspect of the disclosure, the cellulosic substrate can comprise corn cob particles.

Yet another aspect of the disclosure encompasses embodiments of a kit comprising a container containing a composition comprising a population of carbon nanoparticles, wherein said carbon nanoparticles can have at least one species of larvicidal bacteria attached thereto, and instructions for suspending said cells in a liquid medium for delivering the cells to a water body having an infestation of mosquito larvae.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

Now having described the embodiments of the disclosure, in general, the example describes some additional embodiments. While embodiments of present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

EXAMPLES

Example 1

Physical Characteristics of Carbon Nanoparticles that Remain Suspended in Water when Bound to Bti:

The hydrothermally fabricated carbon particles (HTCPs) of the disclosure can be in a range of dimensions from 10 nm to 5 micron, with a generally spherical shape. An advantageous size range is from about 100 nm to about 900 nm. The surface morphology can vary from smooth to rough, depending on the size and type of the precursor used.

When compared to other carbon nanomaterials like carbon black, nanotubes or fullerenes, HTCPs show distinct differences. HTCPs usually exhibit spherical structures that are rich in surface functional groups such as, for example, O—H, C═O, C—O—H. The typical HTCPs display a type of core-shell structure composed of a hydrophobic core together with a stabilizing hydrophilic shell that is both less dehydrated and contains a large number of reactive oxygen functional groups (hydroxyl/phenolic, carbonyl, or carboxylic). The carbon to oxygen+hydrogen ratio is typically 80/20 and it increases with the temperature of the process. Higher-temperature hydrothermal processes (e.g., above 240° C.) yield higher carbon content and some of the structures exhibit graphitic features. The low temperature process (below 120° C.) either does not produce HTCPs or the HTCPs degrade in water in a relatively short time.

Example 2

The HTCPs of the disclosure with high carbon content (fewer functional groups) showed less ability to bind Bti regardless of the type of carbohydrate precursor material. Such particles were also less stable in aqueous environment. The HTCPs with a size larger than 1 micron were less stable in aqueous environment, and less absorbable on a carrier.

The most advantageous results with Bti efficiency were with the Bti bonded to HTCPs with the dimensions from 100 nm to 700 nm, having an amorphous structure (i.e. a turbostratic graphitic core with a polymer-like shell rich in O—H, C═O, C—O—H, etc., functional groups), and insoluble in water Example 3

Binding Bti to Carbon Nanoparticles:

Typically, aqueous suspensions of HTCPs (1% to 10% w/w) were mixed with Bti powder with Bti:HTCPs ratios up to about 0.2. Either magnetic or mechanical stirring was used. The time of mixing varied from a few seconds to 2 h. The solution temperature did not exceed 50° C.

There is some evidence of hydrogen bonding and covalent bonding from the infrared spectroscopy data, but the absorption peaks of Bti and HTCPs overlap significantly leading to indeterminate results.

Figure 1A:
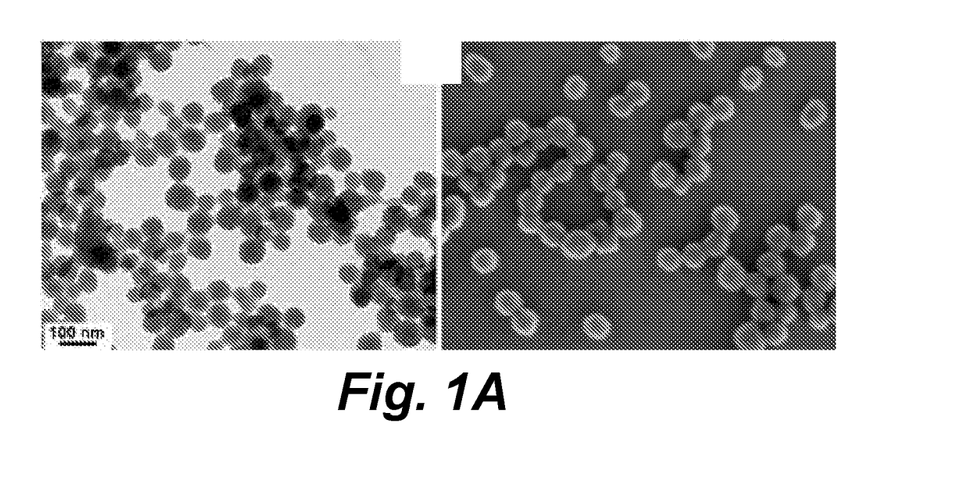
FIG. 1A illustrates a TEM digital image (left) and a SEM digital image (right) of disperse CNBs with mean particle size 50 nm.
Figure 1B:
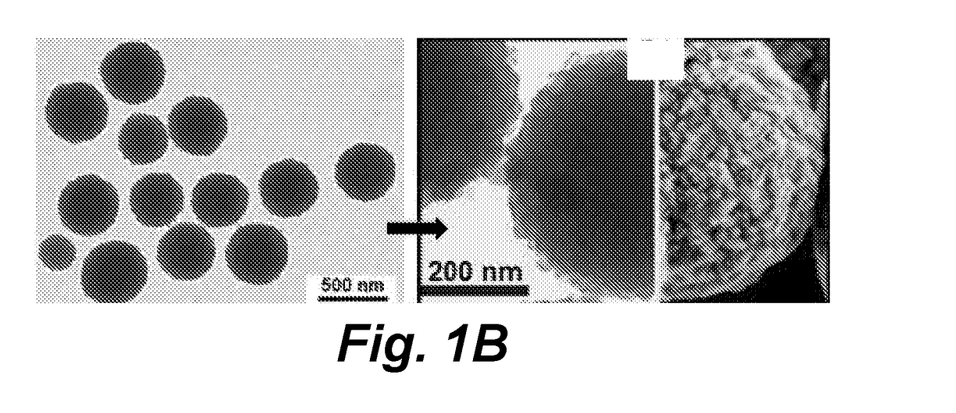
FIG. 1B illustrates a TEM digital image (left) and a SEM digital image (right) of larger spherical hydrothermally fabricated carbon particles (HTCPs) with a rough surface morphology.
Figure 2:
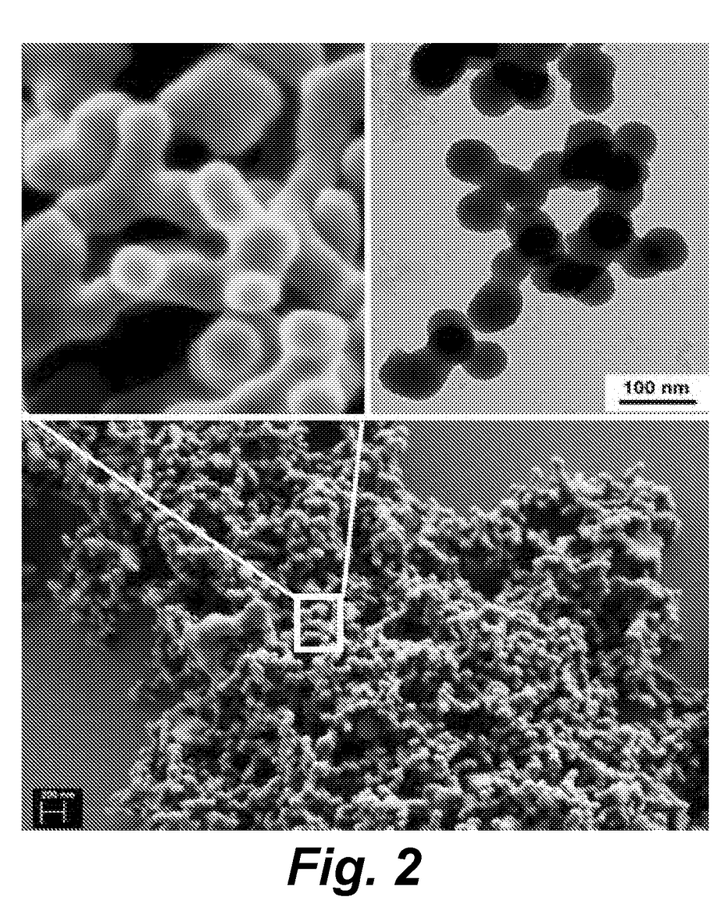
FIG. 2 illustrates SEM (top left) and TEM (top right) digital images of an area of the surface of a large dried particle of HTCPs/Bti combined with a starch binder.

Due to the high reactivity of HTCPs, the particles bind to Bti, and then the resulting system can be bound to a carrier, e.g., starch, cellulose, etc., through similar mixing process. FIG. 2 shows a piece of a large dried particle of HTCPs/Bti with starch binder.

The HTCP size variation between 100 and 1000 nm does not seem to produce much effect on the activity and stability of HTCPs/BTi composite.

Figure 3:
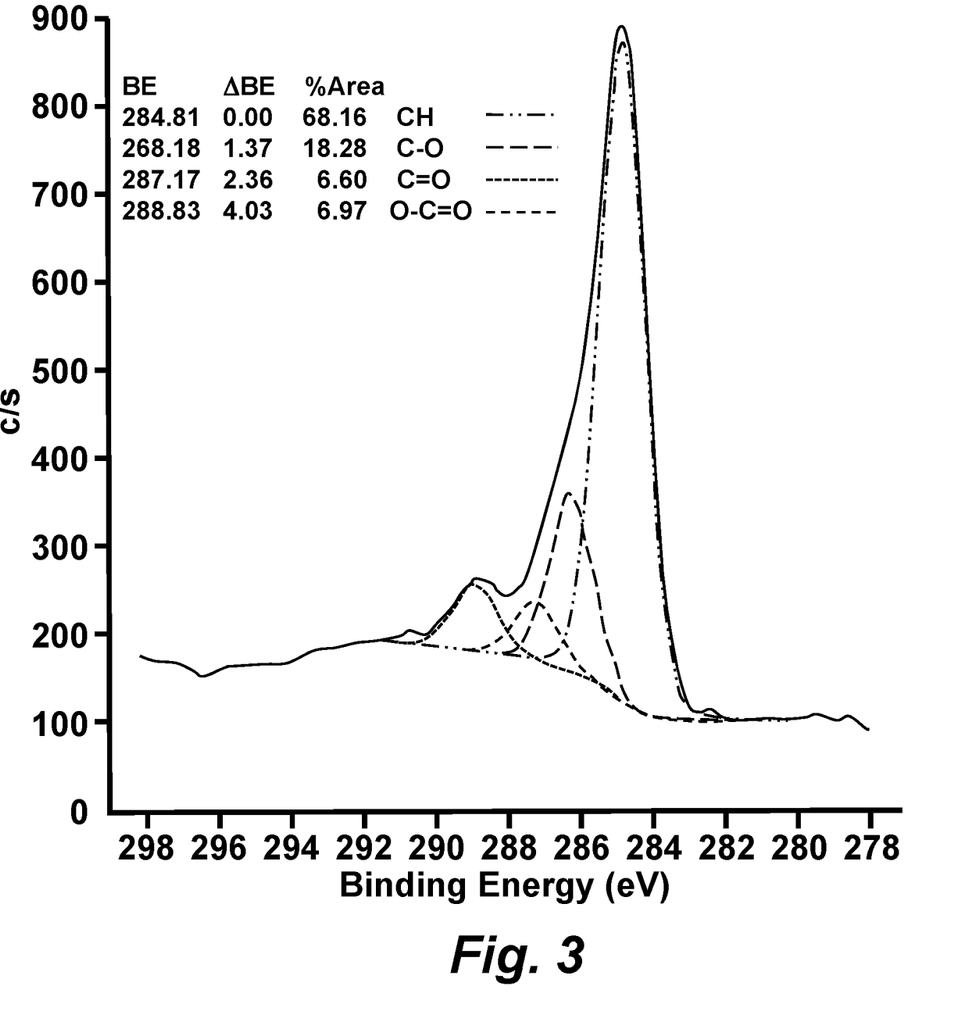
FIG. 3 illustrates a graphical representation of an XPS spectrum of Carbon C1s core energy level in HTCPs. % Area corresponds to the percentage of functional groups.
Figure 4:
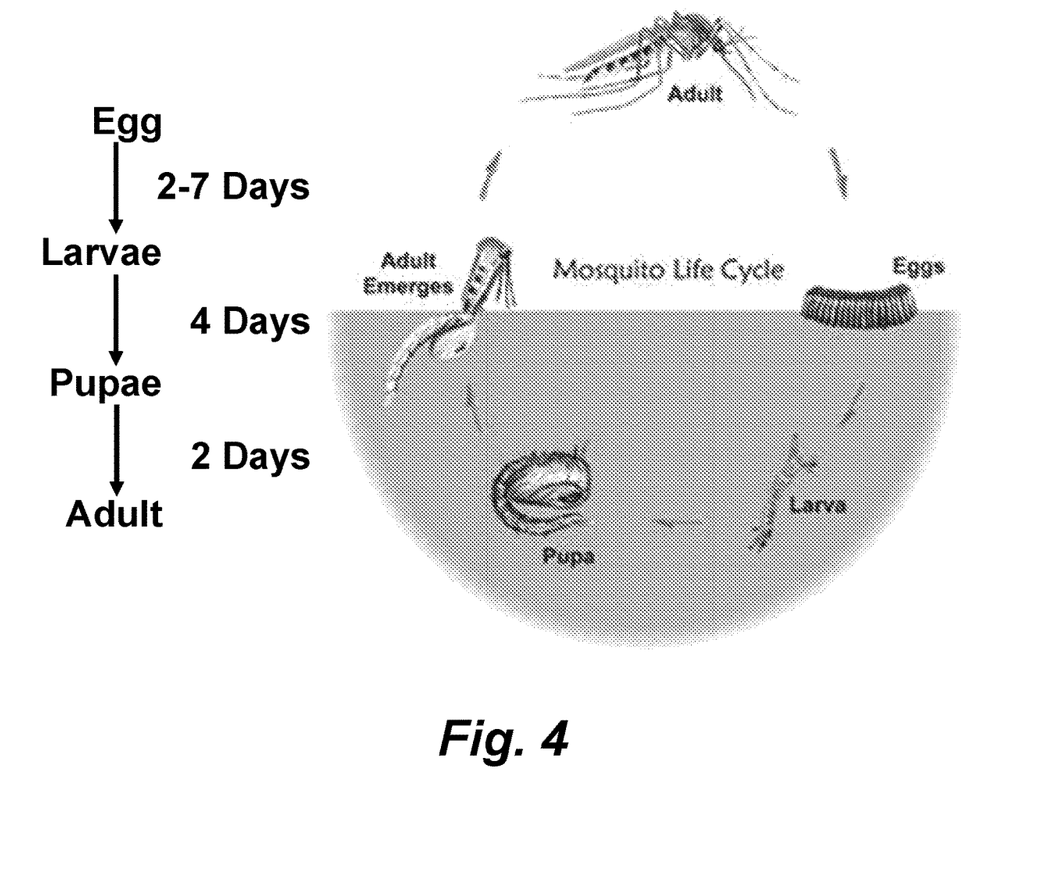
FIG. 4 illustrates a schema of the lifecycle of the mosquito *Aedes aegypti*.
Figure 5:
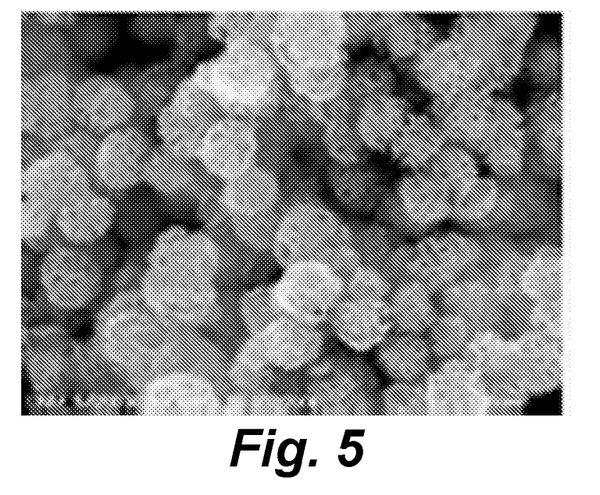
FIG. 5 illustrates a digital scanning electron microscope image of carbon nanospheres of the disclosure.
Figure 6A:
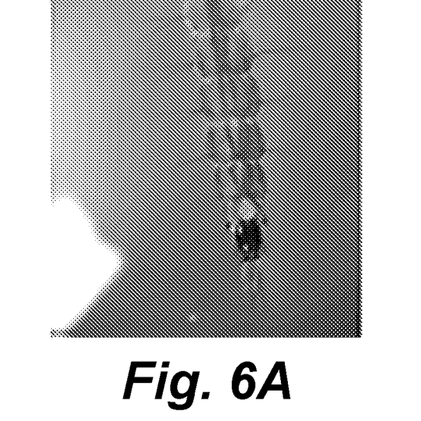
FIG. 6A illustrates a digital image of an *Aedes aegypti* control larva not exposed to the carbon nanoparticle-Bti of the disclosure.
Figure 6B:
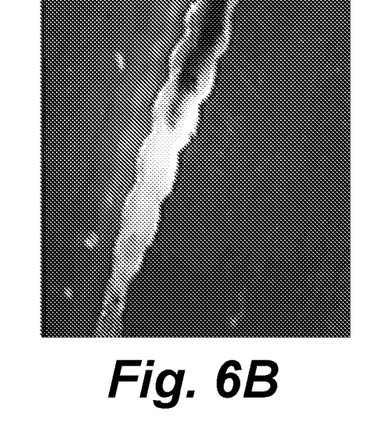
FIG. 6B: illustrates a digital image of an *Aedes aegypti* larva after exposure for 1 h to the carbon nanoparticle-Bti of the disclosure.

The reactive functional groups are naturally formed in the surface layer of HTCPs. A typical % distribution of surface functional groups is shown by the XPS spectrum as shown in FIG. 3.

Example 4

Figure 7:
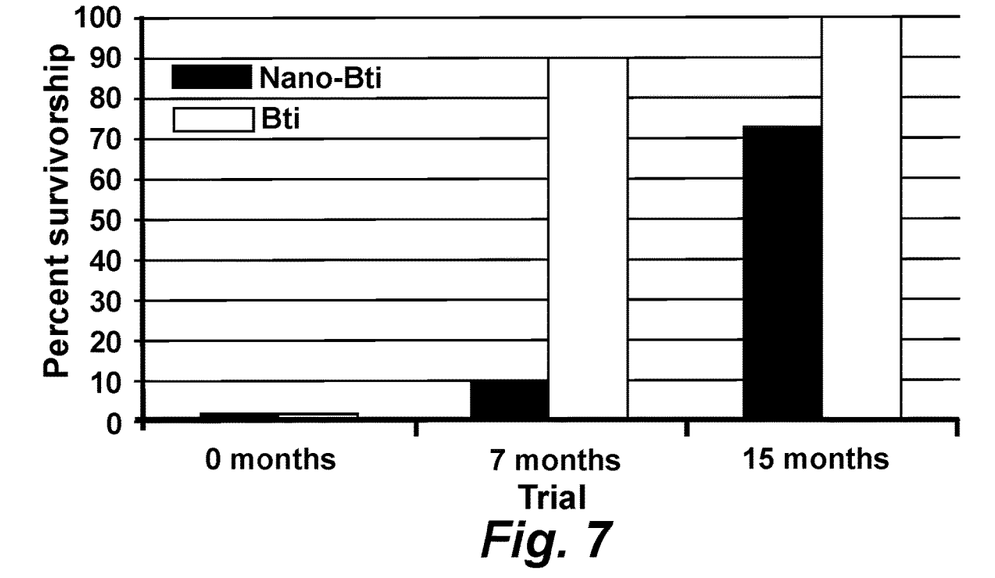
FIG. 7 illustrates a graph showing the survival rate comparison of *Aedes aegypti* larvae exposed for 24 h to carbon nanoparticle-Bti compositions of the disclosure or Bti alone.

Carbon nanospheres were synthesized and cleaned to a uniform nanosphere. Bti was conjugated to the nanosphere (1:5 w:w ratio). A serial dilution was made of carbon nano-Bti to final concentrations of 0.1 mg/mL, 0.01 mg/mL, 0.001 mg/mL, 0.0001 mg/mL, or 0.00001 mg/mL. A Bti control (not conjugated) was also made to final concentrations 0.04 mg/mL, 0.03 mg/mL, 0.02 mg/mL, 0.01 mg/mL, or 0.001 mg/mL. Both solutions were stored at room temperature. Exposures were performed in triplicate, each containing 10 *Aedes aegypti* larvae in a 15 mL Petri dish. Percent survival and behavior were recorded at hourly intervals. Photographs of larvae were also recorded. Trials were conducted at time 0 (initial) and at 7 and 15 months as shown in FIG. 7.

Example 5

To determine if nano-Bti conjugates remained in the water column as compared to Bti alone, nano-Bti was diluted to 0.1 mg/mL and 0.01 mg/mL. Bti was diluted to 0.04 mg/ml and 0.01 mg/mL. Each solution filled 40 mL tubes to a depth of 20 cm.

Figure 8:
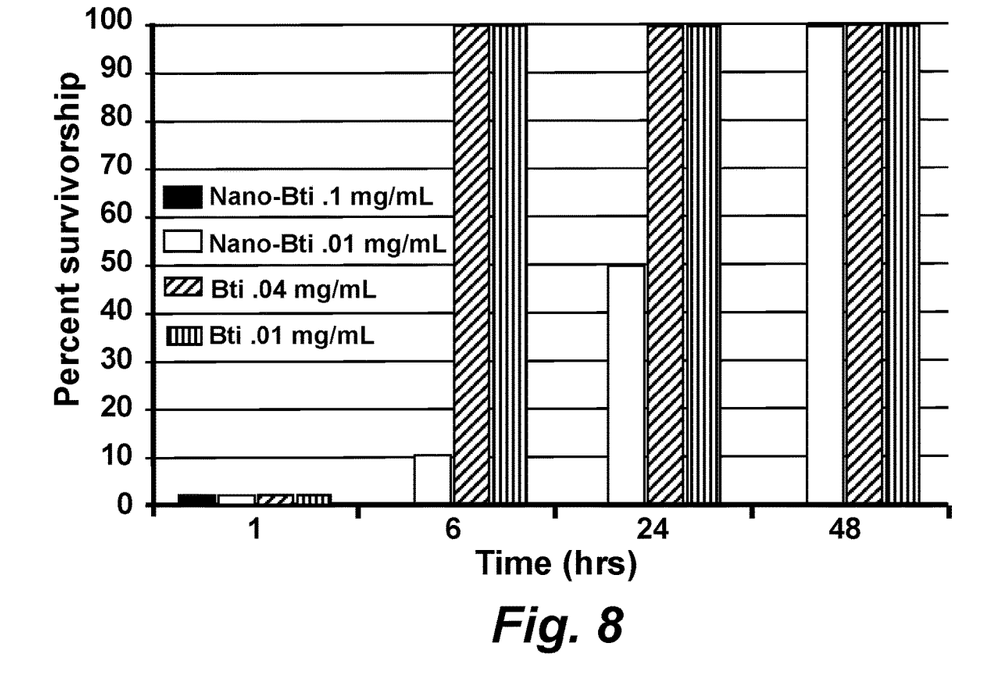
FIG. 8 illustrates a graph showing the water retention and efficacy of carbon nanoparticle-Bti compositions of the disclosure or Bti alone. The efficacy of Bti is potentiated when bound to carbon nanospheres.

At 4 time intervals (1, 6, 24, and 48 h), the top 5 mL of each solution was carefully removed with a micropipettor and administered to Petri dishes containing 10 *Aedes aegypti* larvae each. The percent survival was then recorded at 24 h, as shown in FIG. 8.

We claim:

1. A composition comprising a population of hydrothermally-generated carbon nanoparticles, wherein said carbon nanoparticles have at least one species of larvicidal bacteria attached thereto, and wherein the monosaccharide-derived hydrothermally-generated carbon nanoparticles have a cross-sectional size range from about 100 nm to about 700 nm, wherein the hydrothermally-generated carbon nanoparticles comprises a polymer-like shell containing O—H, C═O, and C—O—H functional groups, wherein there are more C—OH functional groups than C═O functional groups, and wherein the carbon to oxygen+hydrogen ratio is at least 80:20.

2. The composition of claim 1, wherein the at least one species of larvicidal bacteria is a species of *Bacillus*.

3. The composition of claim 1, wherein the at least one species of larvicidal bacteria is a strain of *Bacillus thuringiensis*, a strain of *Bacillus sphaericus*, or a combination thereof.

4. The composition of claim 3, wherein the strain of *Bacillus thuringiensis* is *Bacillus thuringiensis israelensis* (Bti).

5. The composition of claim 3, wherein the strain of *Bacillus sphaericus* is 1593M, 2362 or 2297, or any combination thereof.

6. The composition of claim 1, wherein the hydrothermally-generated carbon nanoparticles are substantially spherical.

7. The composition of claim 1, wherein the bacteria-hydrothermally-generated carbon nanoparticles are bonded to a cellulosic substrate.

8. The composition of claim 7, wherein the cellulosic substrate comprises corn cob particles.

9. The composition of claim 8, wherein the corn cob particles have a size range from 4 to about 35 mesh (4.75 mm-0.5 mm sieve size).

10. The composition of claim 1, wherein the population of hydrothermally-generated carbon nanoparticles is mixed with a liquid medium.

11. The composition of claim 10, wherein the population of hydrothermally-generated carbon nanoparticles is miscible with water.

12. A method of reducing a population of mosquito larvae by delivering to a population of mosquito larvae in a body of water an insect larvicidal composition comprising a population of hydrothermally-generated carbon nanoparticles, wherein said hydrothermally-generated carbon nanoparticles have at least one species of larvicidal bacteria attached thereto, and wherein the hydrothermally-generated carbon nanoparticles have a cross-sectional size range from about 100 nm to about 700 nm, and wherein said insect larvicidal composition is mixed with a liquid medium miscible with the body of water, and wherein said hydrothermally-generated carbon nanoparticles comprise a polymer-like shell containing O—H, C=O, and C—O—H functional groups, wherein there are more C—OH functional groups than C=O functional groups, and wherein the carbon to oxygen+hydrogen ratio is at least 80:20.

13. The method of claim 12, wherein the at least one species of larvicidal bacteria is a species of *Bacillus*.

14. The method of claim 12, wherein the at least one species of larvicidal bacteria is a strain of *Bacillus thuringiensis*, a strain of *Bacillus sphaericus*, or a combination thereof.

15. The method of claim 14, wherein the strain of *Bacillus thuringiensis* is *Bacillus thuringiensis israelensis* (Bti).

16. The method of claim 14, wherein the strain of *Bacillus sphaericus* is 1593M, 2362 or 2297, or any combination thereof.

17. The method of claim 12, wherein the hydrothermally-generated carbon nanoparticles are substantially spherical.

18. The method of claim 12, wherein the bacteria-hydrothermally-generated carbon nanoparticles are bonded to a cellulosic substrate.

19. The method of claim 18, wherein the cellulosic substrate comprises corn cob particles.

20. The method of claim 18, wherein the corn cob particles have a size range selected from the group consisting of: from 4 to about 35 mesh (4.75 mm-0.5 mm sieve size), from about 8 to about 35 mesh (2.36 mm-0.5 mm sieve size), from about 12 to about 35 mesh (1.7 mm-0.5 mm sieve size), from about 16 to about 35 mesh (1.18 mm-0.5 mm sieve size), and from about 20 to about 35 mesh size (0.85 mm to about 0.5 mm sieve size).

21. A kit comprising a container containing a composition comprising a population of hydrothermally-generated carbon nanoparticles, wherein said hydrothermally-generated carbon nanoparticles have at least one species of larvicidal bacteria attached thereto, and instructions for suspending the at least one species of larvicidal bacteria in a liquid medium for delivering the at least one species of larvicidal bacteria to a site of an infestation of mosquito an infestation of mosquito larvae, wherein said hydrothermally-generated carbon nanoparticles comprise a polymer-like shell containing O—H, C=O, and C—O—H functional groups, wherein there are more C—OH functional groups than C=O functional groups, and wherein the carbon to oxygen+hydrogen ratio is at least 80:20.

* * * * *